United States Patent [19]

Popick et al.

[11] 3,930,209

[45] Dec. 30, 1975

[54] TRANSMISSION LINE SIMULATOR

[75] Inventors: Mitchell A. Popick, Stony Brook; Robert M. Milne, III; Suresh K. Aggarwal, both of Queens, all of N.Y.

[73] Assignee: General Signal Corporation, Rochester, N.Y.

[22] Filed: June 5, 1973

[21] Appl. No.: 367,275

[52] U.S. Cl. ........................ 333/23; 328/55; 333/29

[51] Int. Cl.[2] ............... H04B 3/40; H03H 7/16; H03H 7/22

[58] Field of Search ......... 333/23, 20, 97 R, 81 R, 333/81 A; 328/155, 55; 331/78; 324/57 N; 179/175.3

[56] References Cited

UNITED STATES PATENTS

| | | | |
|---|---|---|---|
| 2,502,095 | 3/1950 | Korman | 333/23 |
| 2,773,185 | 12/1956 | Fulton et al. | 332/47 X |
| 3,022,472 | 2/1962 | Tanenbaum et al. | 333/18 R |
| 3,201,719 | 8/1965 | De Monte | 333/23 |
| 3,753,161 | 8/1973 | Iwakami | 333/23 |

OTHER PUBLICATIONS

Everitt – "Communication Engineering", McGraw-Hill, New York, 1937; pp. 294–299.

Tibbs — "Frequency Modulation Engineering", Chapman and Hall Ltd., London, 1947; pp. 10, 164–167, and 290–291.

*Primary Examiner*—Archie R. Borchelt
*Assistant Examiner*—Marvin Nussbaum
*Attorney, Agent, or Firm*—Milton E. Kleinman; Stanley B. Green

[57] ABSTRACT

A transmission line simulator which is capable of simulating a variety of transmission lines. In addition to simulating the specified characteristics of these transmission lines, the simulator is also capable of simulating a number of random transmission line effects which are especially important to digital data transmission. Among these transmission line effects that can be simulated are phase jitter, frequency shift, amplitude hit and/or drop out, harmonic distortion, phase hit, broad band and impulse noise. Each of these effects can be simulated along with simulating delay and attenuation of one of the transmission lines. The amplitude, frequency and timing of the random effects can be varied by an operator, or, if desired, omitted. As a portion of the simulator disclosed herein, a novel line simulator is employed for simulating specified characteristics which are attenuation and delay. It is made up of a number of operational amplifier filters whose filter characteristics can be electronically switched to simulate a variety of different characteristics such as the different line characteristics available from the common carriers.

13 Claims, 12 Drawing Figures

TRANSMISSION LINE SIMULATOR

FIELD OF THE INVENTION

The present invention relates to transmission line simulators, and more particularly transmission line simulators useful in digital data transmission environments.

BACKGROUND OF THE INVENTION

In maintaining digital data communication systems it is often necessary to simulate the characteristics of the transmission line portion of the system. If a communication system exhibits errors above a certain threshhold and correction of this condition is required, it is necessary to locate the source of these errors so that they may be corrected. Such a digital data communication system can be thought of as comprising a transmitter, a transmission line and a receiver. If it is possible to simulate the known characteristics of the transmission line it is then possible to apply the transmitted signal to the simulator. If the output of the simulator exhibits the same errors that are sought to be corrected, then maintenance personnel can determine that the source of the errors lies in the transmitter. However, if the output of the simulator does not exhibit the errors that are exhibited when the system is operated, then the source of these errors can be determined as occurring in the transmission line, and not in the transmitter.

The prior art has used a number of transmission line simulators, mainly in the audio transmission environment. In this environment it was only necessary to simulate the specified characteristics of the transmission line, that is its attenuation and delay characteristics. The common carriers provide a plurality of transmission lines, each of which is defined by what is here termed the specified characteristics; these characteristics consists of a schedule defining attenuation and delay of the line as a function of frequency. Furthermore, most, if not all, of these prior transmission line simulators were dedicated, that is they were designed to simulate this or that specific class of transmission lines. For the purposes of simulating a transmission line in a digital data communication system, then, the prior art transmission line simulators exhibit a number of defects.

In the main, the prior art transmission line simulators employ bulky inductors and capacitors. In the dedicated type of use the size disadvantages of this type of transmission line simulator could be tolerated. However, applying the prior art teachings to a simulator capable of simulating a variety of transmission lines results in a large and bulky unit. Since the simulator may be desired for testing field installations it must be portable. With this consideration in mind, the size of a variable simulator that would result in applying prior art techniques would make portability unduly expensive. The simulator disclosed herein employs operational amplifier filters which can be electronically switched to vary their characteristics. Thus, the variability requirement is met and at the same time the resulting size of the unit is not so large as to prohibit portability.

Although for audio purposes a transmission line can be adequately characterized by its attenuation and delay characteristics it has been found that this limited definition of the transmission line is inadequate for digital communication purposes. In addition to the characteristics of attenuation and delay, account must also be taken of certain random effects, such as phase jitter, frequency shift, amplitude hit and/or drop out, harmonic distortion, phase hit and noise, both broad band and impulse. Except for frequency shift all these effects are transmission line caused modifications of the transmitted signal. Although in many cases the causes of these effects are not known, the effects themselves can be measured. The simulator disclosed herein provides for simulating these random effects, each of them being variable and the simulator also provides for excluding the simulation of one or more of these effects. As used herein the term random effects refers to one or more of the above specified effects.

Before proceeding on we will now individually define the random transmission line effects that have been referred to above.

Phase jitter refers to a periodic variation, or jitter, of the instantaneous phase of the received data signal. The simulator of the present invention allows the amplitude of this phase jitter as well as the frequency of the phase jitter to be adjusted.

Amplitude hits and/or drop outs refer to isolated or non-repetitive instantaneous variations in amplitude of the transmitted signal. If the amplitude of the transmitted signal increases, this is referred to as a hit, and correspondingly, if the amplitude of the signal decreases this is referred to as a drop out.

Phase hit refers to isolated, that is non-repetitive, instantaneous variations in phase. If the phase is advanced this is referred to as a phase hit, and if the phase is correspondingly retarded this is referred to as a phase drop out.

Frequency shift is a result of the normally used suppressed carrier mode of transmission. The carrier at the transmission facility is suppressed and therefore the carrier must be re-inserted at the receiver facility. If any offset exists between the carrier frequency at the transmitter and at the receiver, a relative frequency shift between the carrier of the transmitted signal and the carrier used at the receiver results. The simulator provides the facility for simulating this effect by shifting the frequency spectrum of the signal up or down by an adjustable amount.

Harmonic distortion occurs as a result of clipping which may occur in the transmission line.

The introduction of noise in the transmission of a signal is an effect that is well known in the art. The simulator disclosed herein treats separately broad band and impulse noise. The amplitude of the broad band noise, as well as the amplitude and rate of occurrence of impulse noise, can be varied by the operator.

Although the simulator disclosed herein enjoys particular utility in the location of the source of errors in the transmission system, it can be further utilized for determining whether or not the elimination of a particular effect will affect the desired reduction of errors in the transmitted signal. To this end, for instance, the frequency shift introduced by the simulator can be selectively increased or decreased. Monitoring the output signal of the simulator for errors enables one to determine the effect of variations in the frequency shift on the error rate. In a like manner the other effects can be selectively increased or decreased, either singly or in combination with variations in other effects, to determine the manner in which such changes may affect the error rate of the transmitted signal.

Another important utility for the simulator disclosed herein lies in the testing of particular transmission line interfaces. That is, a manufacturer may want to test a particular transmission line interface in the presence of one or more of a combination of random effects that his apparatus will meet when employed in field use. Since the effects referred to above are random in nature, testing the interface in connection with an actual transmission line may require an unduly long period of time to encounter the desired effects. Using the simulator of the present invention the operator can simply properly adjust the simulator for a particular frequency shift, for instance, or a particular combination of transmission line noise, or phase jitter, etc. and then test his transmission line interface under these conditions. Insofar as the applicant is aware this capability was totally lacking in the prior art.

In connection with the description of the specific embodiment of the simulator disclosed herein, reference will be made to the following drawings wherein like reference characters identify identical apparatus, and in which:

FIG. 1 is a front view of the control panel of the simulator of the present invention;

FIG. 2 is a schematic block diagram of the simulator of the present invention;

FIG. 2*a* is a circuit diagram of an operational amplifier filter used as one element of the circuitry for simulating attenuation and delay;

FIG. 3 (including FIGS. 3*a* and 3*b*) is a circuit diagram of a portion of the preferred embodiment of the simulator of the present invention;

FIG. 4 (including FIGS. 4*a*, 4*b* and 4*c*) is a circuit diagram of another portion of the preferred embodiment of the simulator of the present invention;

FIG. 5*a* is a graphical representation of the attenuation and delay characteristics of one class of transmission line along with a showing of the characteristic attenuation and delay of the apparatus shown in FIG. 4;

FIG. 5*b* is a representation of the attenuation and delay characteristics of another class of transmission line along with a representation of the attenuation and delay of the apparatus shown in FIG. 4;

FIG. 5*c* is a representation of the attenuation and delay characteristics of still another class of transmission line along with a showing of the attenuation and delay of the apparatus shown in FIG. 4;

and FIG. 5*d* is a representation of the attenuation and delay characteristics of still another class of transmission line along with a showing of the attenuation and delay characteristic of the apparatus shown in FIG. 4.

Figure 1:
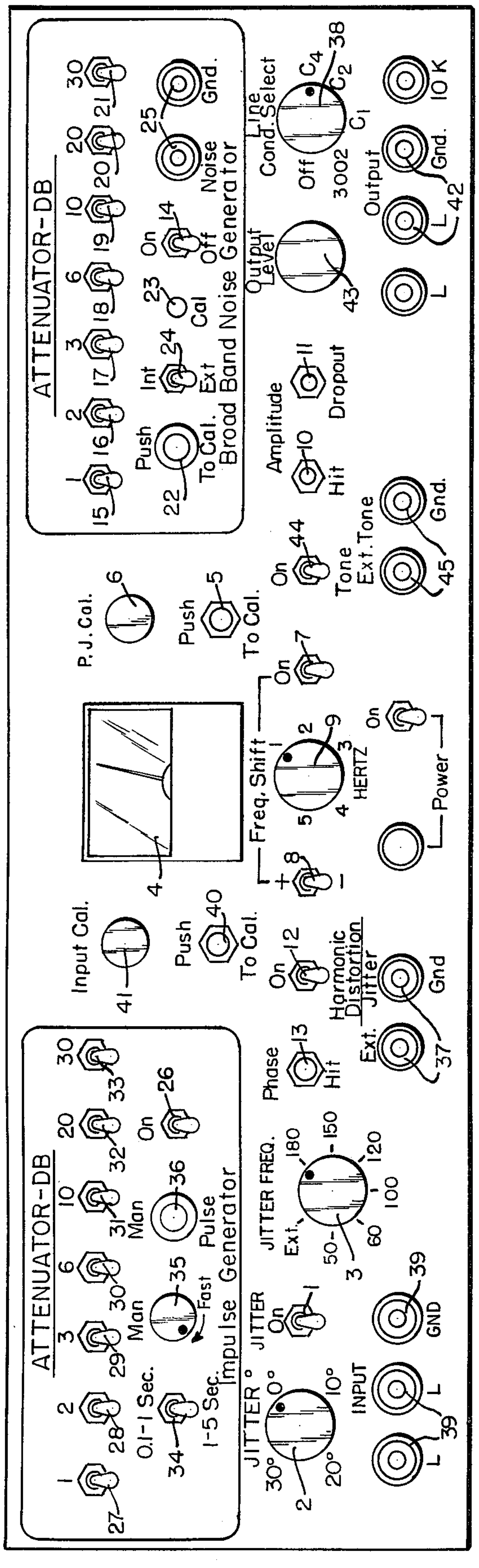
FIG. 1 shows the control panel for the simulator disclosed herein. The control panel provides for all necessary operator adjustments to simulate a variety of transmission lines. There are eight major functions including the random effects of phase jitter, frequency shift, amplitude hit and/or drop out, harmonic distortion, phase hit, broad band noise, impulse noise, as well as the pre-determined effects of attenuation and delay. The controls for each of these functions will be discussed in turn.

The phase jitter controls include an on-off switch 1, an amplitude determining control 2, and a phase jitter frequency control 3. Jitter frequency select knob 3 also provides for an external jitter frequency to be used. This signal, when utilized, is applied to terminals 37. In order to intelligently select the amplitude of the phase jitter a meter 4 is provided. Meter 4 is a multi-purpose meter which may be connected to a variety of signals in the simulator. The depression of pushbutton switch 5 connects the meter to the phase jitter signal. Phase jitter calibrator knob 6 allows the operator to control the phase jitter amplitude for calibration purposes.

The frequency shift controls include an on-off switch 7, a reversing switch 8, and a frequency control 9. The frequency shift apparatus enables the carrier frequency to be either increased or decreased by a selected amount. Reversing switch 8 controls whether or not the frequency is increased or decreased. The amount of frequency shift is controlled by control knob 9, settable to one of five different positions or frequencies 1–5 Hertz.

The amplitude hit and/or drop out controls include pushbutton switches 10 and 11. For an amplitude hit, pushbutton 10 is depressed and correspondingly for an amplitude drop out pushbutton 11 is depressed.

The harmonic distortion controls include switch 12. Harmonic distortion is introduced by setting switch 12 to its on position.

The phase hit controls include pushbutton switch 13. Phase hit can be provided by depressing pushbutton switch 13.

The broad band noise generator controls include an on-off switch 14 and switches 15–21 which attenuate the output of the noise generator by 1–30 db, respectively. For selecting the amplitude of the noise signal which is introduced into the attenuator calibration controls are provided. A pushbutton 22 allows the meter 4 to read the amplitude of the broad band noise signal and control 23 enables the amplitude to be varied. Provision is made for using an external noise signal when switch 24 is in the external position. An internal position is provided for this switch when the oscillator contained in the simulator is utilized. The external noise signal, when used, is introduced via terminals 25.

The impulse noise generator controls include an on-off switch 26. The amplitude of the signals produced by the impulse generator can be controlled by attenuator switches 27–33 which provide for different degrees of attenuation. The rate of production of signals is controlled by two-position switch 34, in conjunction with control 35. In the upper position of switch 34 the control knob 35 selects the period between pulses in the interval 0.1–1 second. In the lower position of switch 34 the control knob 35 selects the period between pulses in the interval 1–5 seconds. Provision is also made for manually producing pulses by means of pushbutton switch 36.

In order to control the attenuation and delay of the line being simulated, control 38 provides for selecting between four different classes of transmission lines, denoted 3002, C1, C2 and C4. Furthermore, an off position is provided which disables the simulation of attenuation and delay.

The input to simulator is provided through terminals 39. In order to calibrate this signal pushbutton switch 40 provides the input signal across the meter 4 and control 41 provides control of the amplitude of the input signal. The output from the simulator is provided at terminals 42. An output level control 43 is provided so that the output level can be varied.

A tone switch 44 and tone input terminals 45 are also provided. Such tones are used for signaling purposes on transmission lines. The switch 44 and terminals 45 allow use of an external tone signal for simulation purposes.

Figures 2, 2A:
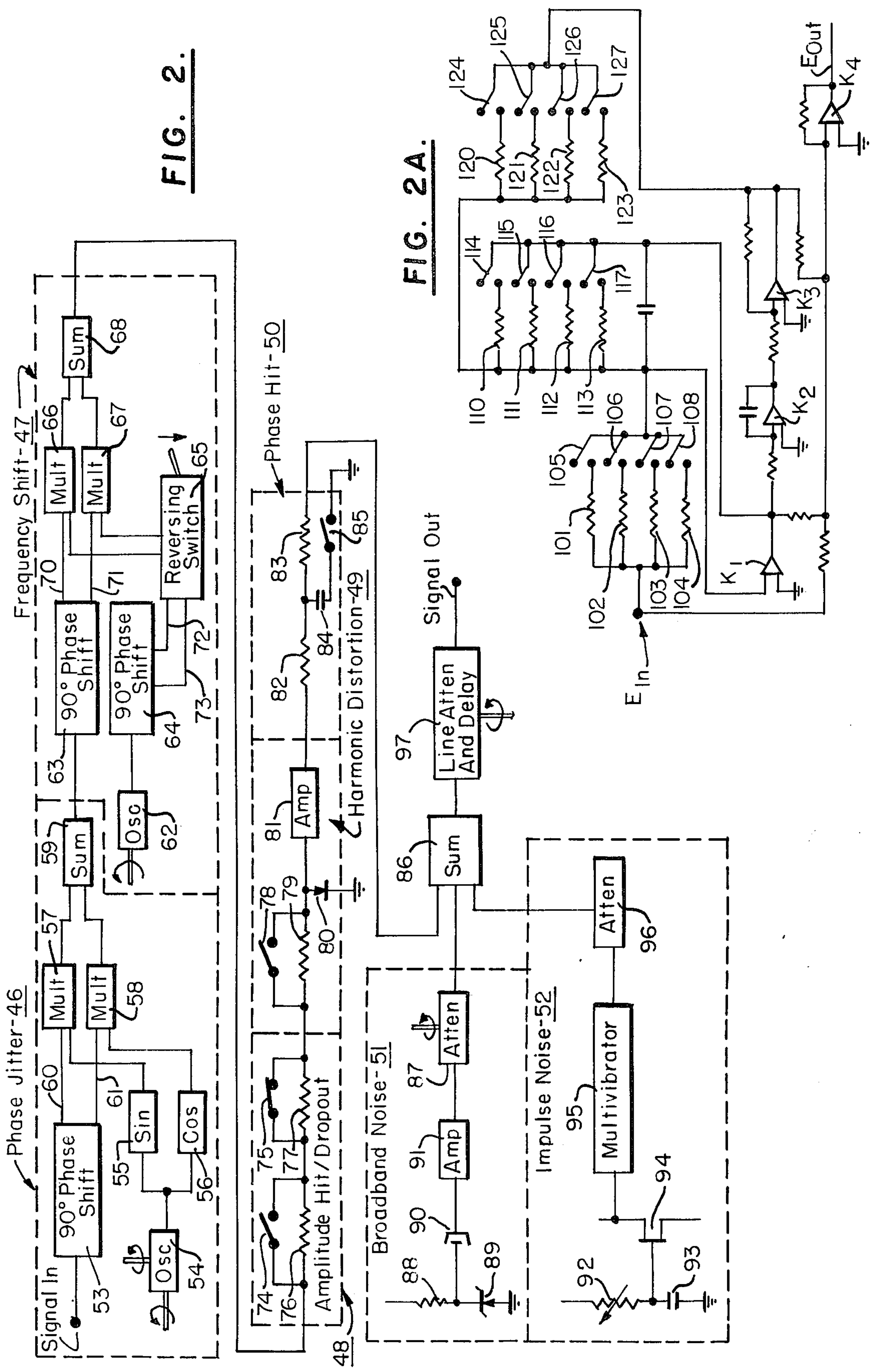

FIG. 2 shows in block diagram form the apparatus used to achieve the eight functions performed by the simulator. The apparatus enclosed by block 46 provides simulation of phase jitter, the apparatus of block 47 provides frequency shift simulation, the apparatus of block 48 provides amplitude hit and/or drop out simulation, the apparatus of block 49 provides harmonic distortion simulation, the apparatus of block 50 provides phase hit simulation, the apparatus of block 51 provides a broad band noise generator and the apparatus of block 52 provides an impulse noise generator.

Before discussing the apparatus of block 46 it will be helpful to understand what the term phase jitter means and how it is simulated. A sinusoidal carrier can be represented by the function A sin $wt$, where A is the amplitude of the carrier and $w$ is its radian frequency. Phase jitter refers to the condition where the instantaneous phase of the received signal jitters, typically at rates of 180 Hz and below. This effect is primarily caused by ripple in the dc power supply although it can also be caused by incomplete filtering. A signal with phase jitter can be represented by the function A sin $(wt + B \sin w_j t)$ where B is the amplitude of the phase jitter itself and $w_j$ is the frequency of the phase jitter. The manner in which the apparatus in block 46 produces a signal of the above type will now be explained.

Oscillator 54 provides the signal B sin $w_j t$. It should be noted that the output of oscillator 54 is adjustable as to the amplitude, that is the magnitude B, and its frequency, that is $w_j$. The operator can vary the amplitude by manipulating control knob 2 (shown in FIG. 1) and he can vary $w_j$ between 60 and 180 Hz by manipulating control knob 3 (shown in FIG. 1). The output of the oscillator is fed through a sine and cosine generating network 55 and 56 such that the signal produced from network 55 is of the form sin B sin $w_j t$ and the signal produced by cos network 56 is of the form cos B sin $w_j t$. These signals are respectively fed to multipliers 57 and 58. The other input to these multipliers is provided by phase shift network 53. The input to this phase shift network is the signal input to the simulator. The phase shift network 53 produces two output signals, appearing on lines 60 and 61. The first is the input signal unchanged and the second is the input signal delayed by 90°. Thus, the first signal can be represented by A sin wt and the second signal can be represented by A cos wt. Consequently the output from multiplier 57 is of the form A sin wt sin sin $w_j t$ and the signal produced by multiplier 58 is of the form A cos wt cos sin $w_j t$. Applying well known trigonometric relations the first expression can be written as:

$$A/2[\cos(wt - \sin w_j t) - \cos(wt + \sin w_j t)]$$

The second expression can be reduced to:

$$A/2[\cos(wt + \sin w_j t) + \cos(wt - \sin w_j t)]$$

The summation of these two signals performed by summing amplifier 59 is of the form A cos $(wt - \sin w_j t)$. This indicates the manner in which the phase jitter is provided. Variations in amplitude and/or frequency of the oscillator can thus vary the magnitude and frequency of the phase jitter introduced. The particular circuit configuration used for the phase shift circuit 53, the oscillator 54, sin network 55, cos network 56, multipliers 57 and 58, and summing amplifier 59 are shown in more detail in FIG. 4.

Most long haul transmission systems operate in the single side band suppressed carrier mode. Because the carrier is not transmitted and must be reinserted locally, there will be differences in frequency between the modulating and the demodulating carriers. This can cause frequency errors as the received frequency may be somewhat different from the transmitted frequency. This effect can degrade some data demodulation processes, and can cause high distortion in narrow band frequency division multiplex systems. In order to simulate frequency shift the simulator disclosed herein provides a signal whose frequency is shifted slightly from the frequency of the input signal. The amount that the frequency of the input signal is shifted is determined by the frequency of oscillator 62. Whether or not the input frequency is increased or decreased is determined by the position of reversing switch 65. The frequency shift apparatus 47 employs two 90° phase shift networks 63 and 64. The first, 63, provides an output signal which is identical to its input signal and another output signal which is shifted 90° in phase with respect to the input signal. The phase shift network 64 operates in a similar manner upon the output of oscillator 62. One of the outputs of phase shift network 63 is applied to multiplier 66 and the other is applied to multiplier 67. Which of the outputs of phase shift network 64 is applied to multiplier 66 and multiplier 67 is determined by the position of reversing switch 65. Finally, the sum of the outputs of multipliers 66 and 67 is provided by amplifier 68.

To show the manner in which the apparatus associated in block 47 performs a frequency shift function we will assume that the output of phase shift network 63 on line 70 is identical with the input to the phase shift network, and that the output on line 71 is shifted 90° in phase. In a like manner, we will assume that the output of phase shift network 64, on line 72, is identical with the input to phase shift network 64 and that the output of phase shift network 64 on line 73 is shifted 90° in phase with respect to the input to phase shift network 64. Thus, we can consider the output of line 70 as A sin wt, and the output of line 71 can be considered as A cos wt. In a like manner we can consider the signal on line 72 as sin $w_s t$ and the signal on line 73 as cos $w_s t$, where $w_s$ is the frequency of the oscillator 62. We will also assume that the reversing switch 65 is positioned so that the signal on line 72 is input to multiplier 66 and the signal on line 73 is input to multiplier 67.

As a result the output of multiplier 66 can be expressed as A sin $wt$ sin $w_s t$ and the output of multiplier 67 can be expressed as A cos $wt$ cos $w_s t$. When these signals are summed, by summing amplifier 68, the resulting signal can be expressed, using trigonometric identities, as A cos $(w - w_s)t$. Thus, the output of summing amplifier 68 is at a frequency $w - w_s$, or a frequency $w_s$ less than the frequency of the input signal.

If, on the other hand, the reversing switch 65 were positioned so that the signal on line 72 were input to multiplier 67 and the signal on line 73 were input to multiplier 66, then we can write an expression for the output of multiplier 66 as A sin wt cos $w_s t$ and the output of multiplier 67 can be expressed as A cos wt sin $w_s t$. Using trigonometric identities the first expression can be arranged as follows:

$$A/2[\sin(wt + w_s t) + \sin(wt - w_s t)]$$

and the second expression can be rearranged as follows:

$$A/2[\sin(wt + w_s t) - \sin(w_s t - wt)]$$

By utilizing the additional trigonometric identity that sin $(-x)$ equals $-\sin x$, we realize that the sum of these two expressions is equal to A sin $(w + w_s)$t. Thus, the frequency of the signal has been increased by an amount $w_s$. The reversing switch 65 is controlled, on the front panel of the simulator, by switch 8 and the frequency of oscillator 62 is controlled on the front panel of the simulator by control knob 9. The particular circuit arrangements used for the oscillator 62, the phase shift network 63 and 64, the multiplier 66, 67 and the summing amplifier 68, are shown in more detail in FIG. 4.

Amplitude hits and/or drop outs are defined as the unexplained random increases or decreases in amplitude of the received signal. This function is synthesized in block 48 by means or resistors 76 and 77 which are respectively connected in parallel with switches 74 and 75. In order to effect an amplitude hit the normally open switch 74 is closed, shorting out resistor 76. In order to effect an amplitude drop out the normally closed switch 75, shorting out resistor 77, is opened. The switches 74 and 75 correspond, respectively, to pushbutton switches 10 and 11 shown in FIG. 1.

Harmonic distortion results from the selective attenuation of certain frequencies. The simulator provides harmonic distortion by clipping the signal with the apparatus shown in block 49. The apparatus includes switch 78, resistor 79, diode 80 and amplifier 81. With switch 78 open, the distortion introduced by diode 80 is essentially eliminated by amplifier 81 through adjustment of the signal level. However, when switch 78 is closed, the gross distortion that is introduced by reason of diode 80 cannot be adjusted for by amplifier 81 and is thus passed on to the remainder of the circuit. Switch 78 corresponds to two-position switch 12 (shown in FIG. 1). When in the on position, the positive going portions of the signal are clipped.

The apparatus to simulate phase hit is shown in block 50. In contrast with the apparatus to introduce phase jitter, shown in block 46, the phase hit is a random abrupt phase change. The apparatus to provide phase hit includes resistors 82 and 83, capacitor 84 and switch 85. Normally, with switch 85 open, the capacitor 84 does not affect the circuit. However, when switch 85 is closed, the RC circuit produces an abrupt 45° phase shift, or phase hit. Switch 85 corresponds to pushbutton switch 13 (shown in FIG. 1).

The signal output from phase hit apparatus 50 provides one input to summing amplifier 86. Although FIG. 2 shows the phase jitter, frequency shift, amplitude hit and/or drop out, harmonic distortion and phase hit apparatus in a particular order, it should be understood that the order can be varied. That is, the order shown in FIG. 2 is arbitrary and any other order selected will be entirely adequate. Furthermore, it should be understood that by properly adjusting the controls for each of these circuits, the effects produced by the circuit can be eliminated. That is, for instance, if it is desired to have no phase jitter, proper operation of the controls (shown in FIG. 1) will eliminate any phase jitter.

A broad band noise generator 51 provides another input for summing amplifier 86. The broad band noise generator 51 provides a substantially complete noise spectrum in the interval of interest. The noise level can be adjusted by the attenuator 87. In addition to attenuator 87 the apparatus includes a resistor 88, a zener diode 89, an electrolytic capacitor 90 and an amplifier 91. The actual noise source is the zener diode 89. The noise signal is amplified by amplifier 91 and is then attenuated to a degree selected by the operator, by attenuator 87. The controls for attenuator 87 are shown in FIG. 1 as switches 15–21.

A further input to summing amplifier 86 is provided by impulse noise generator 52. Generator 52 includes a variable resistor 92, capacitor 93, unijunction transistor 94, multivibrator 95 and attenuator 96. The repetition rate of the noise generator is determined by varying the RC time constant of resistor 92 and capacitor 93. The unijunction transistor 94 provides a signal to multivibrator 95 at a rate determined by the last mentioned circuit. The multivibrator 95 provides the pulse which is then attenuated, selectively, by attenuator 96. The attenuation controls are shown in FIG. 1 as switches 27–33.

The resultant signal produced by summing amplifier 86 includes the broad band noise and impulse noise provided by generators 51 and 52 and also includes the input signal as modified by the phase jitter circuit 46, the frequency shift circuit 47, amplitude hit and/or drop out circuit 48, the harmonic distortion circuit 49, and the phase hit circuit 50 in a manner determined by the setting of the selective controls shown in FIGS. 1 and 2. The only remaining simulation necessary to the simulator is to simulate the attenuation and delay of the class of transmission line selected by the operator.

Figure 5A:
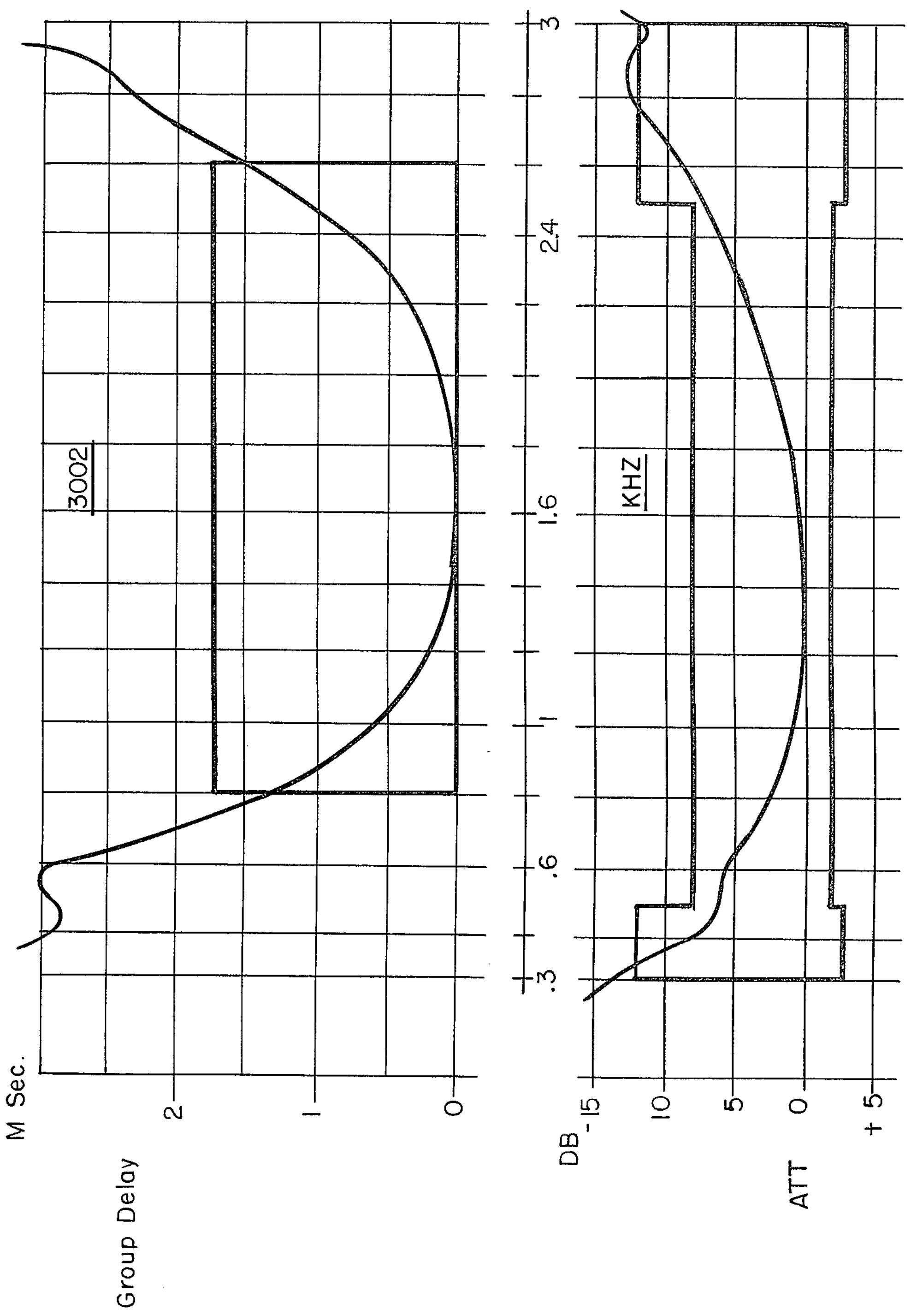

FIGS. 5a-5d show the attenuation and delay characteristics of four classes of transmission lines. FIG. 5*a* shows the attenuation and delay characteristics of a transmission line class 3002. As shown in FIG. 5*a*, the attenuation for this class of transmission line is defined from 300 Hz to 3000 Hz. The attenuation is less than 12 db, from 300 to 500 Hz; it is less than 8 db from 500 to 2500 Hz; and it is less than 12 db from 2500 Hz to 3000 Hz. The delay characteristic is defined between 800 and 2600 Hz, and in this interval it is less than 1750 microseconds.

Figure 5B:
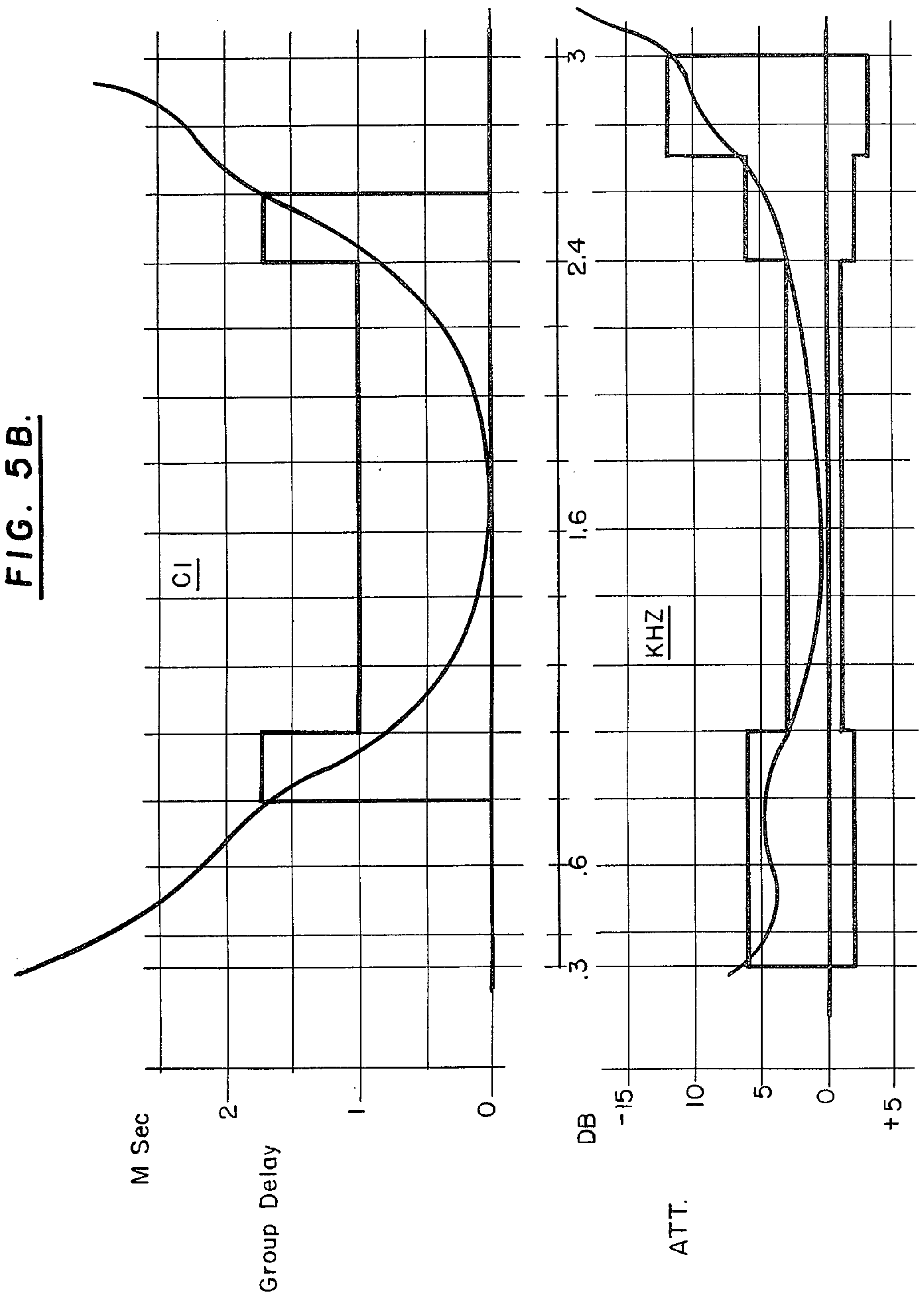

Reference to FIG. 5*b* shows the attenuation and delay characteristics for a transmission line of class C1. C1 refers to the particular conditioning which is used to improve the delay and attenuation characteristics with respect to the characteristics shown in FIG. 5a. The attenuation characteristics for this class of transmission line is defined from 300 to 3000 Hz. From 300 to 1000 Hz the attenuation is less than 6 db; from 1000 to 2400 it is less than 3 db; from 2400 to 2700 it is less than 6 db; and from 2700 to 3000 it is less than 12 db. The delay characteristic for the C1 transmission line is defined from 800 to 2600 Hz. From 800 to 1000 the delay is less than 1750 microseconds, from 1000 to 2400 the delay is less than 1000 microseconds, and from 2400 to 2600 Hz the delay is less than 1750 microseconds.

Figure 5C:
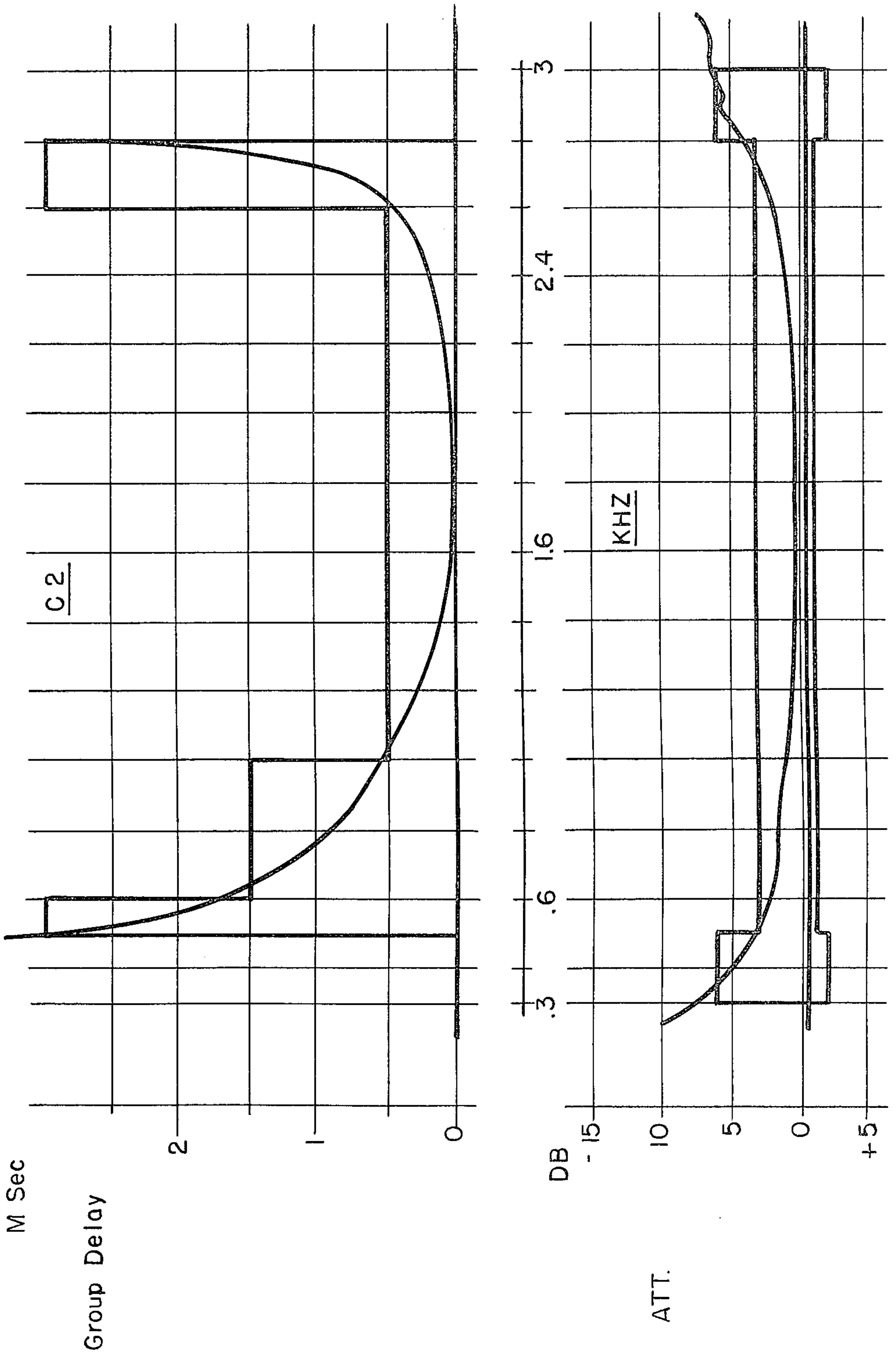

FIG. 5*c* shows the delay and attenuation characteristics for a C2 transmission line. The C2 refers to the conditioning of the transmission line which is more pronounced than the C1 conditioning shown in FIG. 5b. The attenuation characteristics for the C2 transmission line are defined from 300 to 3000 Hz. From 300 to 500 Hz the attenuation is less than 6 db; from 500 to 2800 Hz the attenuation is less than 3 db; and from 2800 to 3000 Hz the attenuation is less than 6 db. The delay characteristic for this class of transmission line is defined from 500 to 2800 Hz. From 500 to 600 Hz the delay is less than 3000 microseconds, from 600 to 1000 Hz the delay is less than 1500 microseconds, from 1500 to 2600 Hz the delay is less than 500 microseconds, and from 2600 to 2800 Hz the delay is less than 3000 microseconds.

Figure 5D:
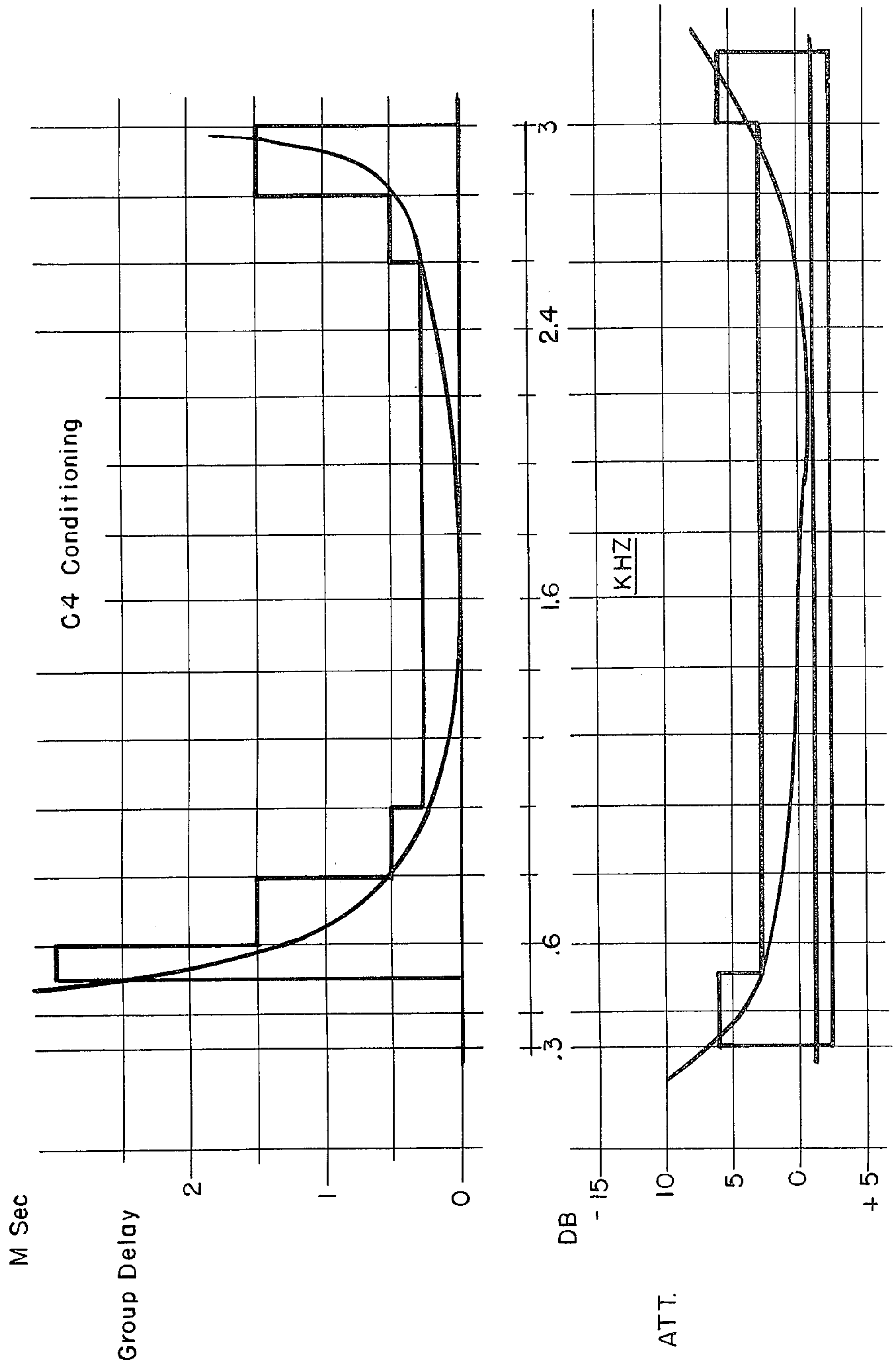

FIG. 5*d* shows the delay and attenuation characteristics of the C4 class of transmission lines. The C4 conditioning is even more pronounced than the C2 conditioning shown in FIG. 5c. The attenuation characteristics for the C4 transmission line are defined from 300 to 3200 Hz. From 300 to 500 Hz the attenuation is less than 6 db; from 500 to 3000 Hz the attenuation is less than 3 db; and from 3000 to 3200 Hz the attenuation is less than 6 db. The delay characteristics for this class of transmission line is defined from 500 to 3000 Hz. From 500 to 600 Hz the delay is less than 3000 microseconds, from 600 to 800 Hz the delay is less than 1500 microseconds, from 800 to 1000 the delay is less than 500 microseconds, from 1000 to 2600 Hz the delay is less than 300 microseconds, from 2600 to 2800 Hz the delay is less than 500 microseconds, from 2800 to 3000 the delay is less than 150 microseconds.

In order to simulate the delay and attenuation characteristics of a transmission line the simulator disclosed herein employs a novel delay and attenuation characteristic simulator which comprises a number of operational amplifier filters, one of which is illustrated in FIG. 2*a*. Before explaining in detail the construction and operation of the circuit, we will initially refer to FIG. 2*a* which shows one such filter. The filter comprises a number of operational amplifiers, K1–K4, and a number of resistors and condensors shown in FIG. 2*a*. We will be particularly interested in three of the resistors, one of 101–104, the input resistor; one of 110–113, a one-stage feedback resistor; and one of 120–123, a three-stage feedback resistor. The input signal is applied to the input terminal $E_{in}$, and the filtered signal appears at the output terminal $E_{out}$. This particular filter is referred to as a Biquad and its characteristics are set forth in "The Biquad: Part I — Some Practical Design Considerations", by Lee C. Thomas, in IEEE Transactions on Circuit Theory, Vol, CT-18, No. 3, May, 1971, at pages 350–357. As employed in the delay and attenuation simulator disclosed herein, the input resistor, a one-stage feedback resistor and a three stage feedback resistor are made selectable in order to vary the filter characteristic so as to simulate a variety of different classes of transmission lines. In particular, the attenuation characteristics of this filter is controlled for the different classes of transmission lines by selecting one of 110–113. In order to adjust the delay for the different classes of transmission lines, one of resistors 101–104 is selected. One of 120–123 is selected to control the resonant frequency of the filter. The switches 105–108, 114–117, and 124–127 which select the particular resistor to be effective are actually realized by a FET as shown in FIG. 3.

Figure 3A:
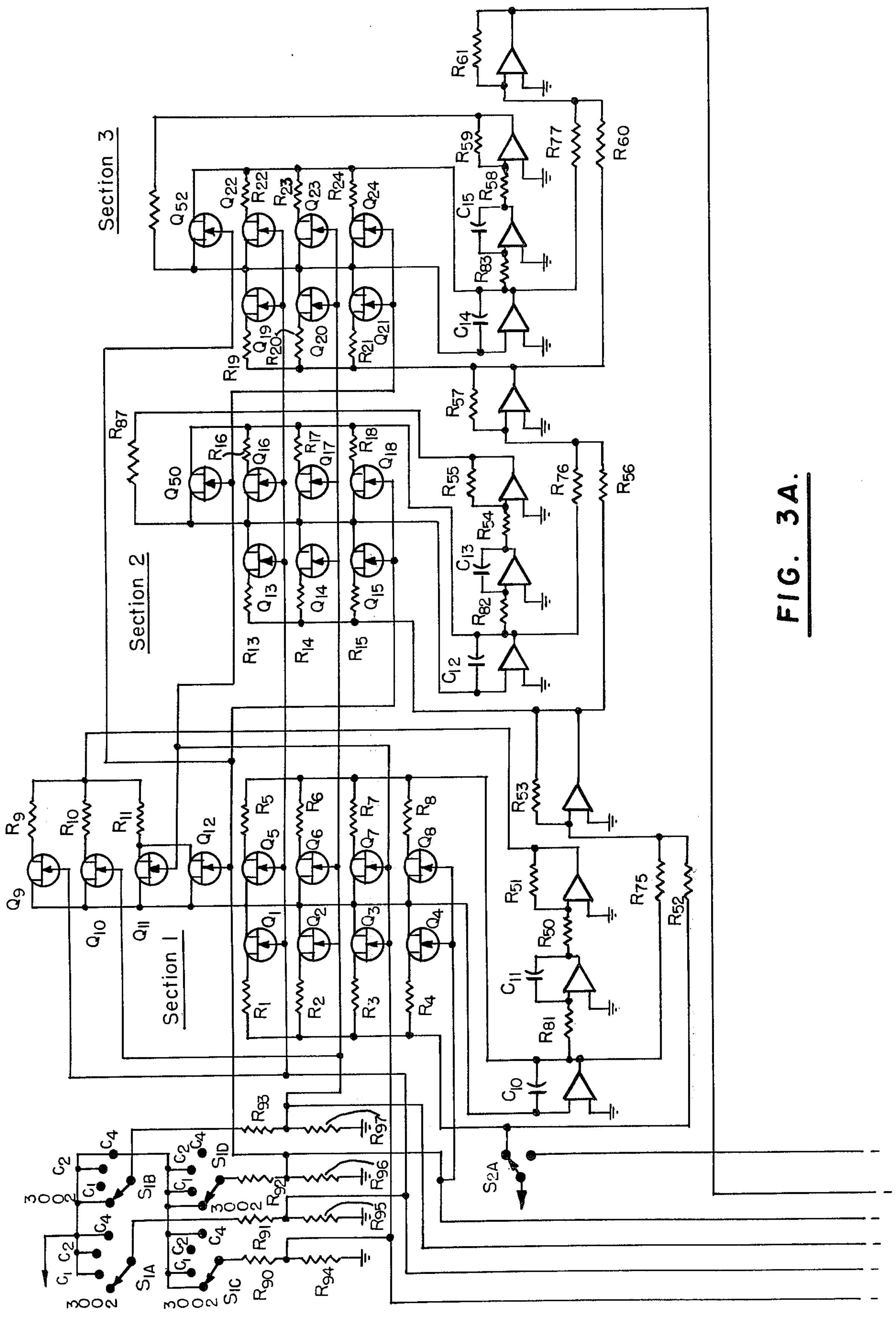
Figure 3B:
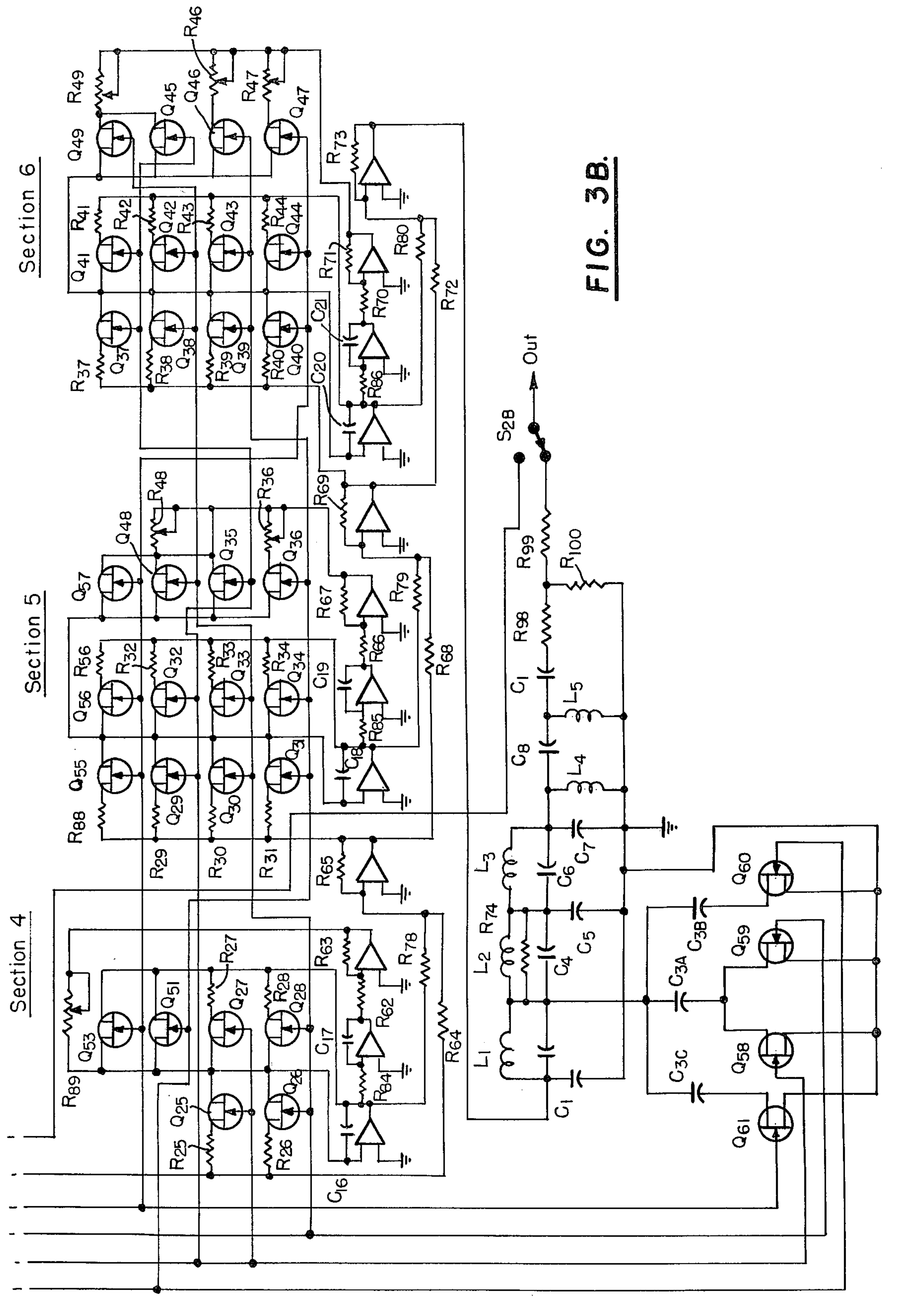

FIGS. 3*a* and 3*b* are a schematic wiring diagram of the delay and attenuator simulator. It will be noted that the circuit comprises six sections of the Biquad of FIG. 2*a*. The particular resistor which performs the functions determining attenuation, delay and resonant frequency is selectable by means of a switching network of FET's. In addition, a rotary switch is provided to select the particular FET's enabled. Furthermore, a band pass filter is provided after the sixth biquad section, comprising $L_1$–$L_5$, $C_1$–$C_9$ and $R_{98}$–$R_{100}$. This filter limits the signals passed by the circuit to those within the frequency interval of interest, that is the frequency spectrum defined for the lines being simulated.

The rotary switch S1 has poles S1*a*, S1*b*, S1*c*, and S1*d*. Each pole is correlated with a class of the transmission lines that can be simulated; thus, for instance pole S1*a* is associated with the 3002 class, and pole S1*b* is associated with the C1 class. For any particular pole, the switch contacts which do not correspond to the class of transmission line corresponding to that pole are tied to a low voltage such as -10 or -15 volts. The switch contact which does correspond to the class of transmission line corresponding to the pole is not connected to a voltage source. Thus, pole S1*a* which corresponds to the 3002 class has its associated contact C1, C2 and C4 connected to the low voltage and its contact 3002 floating. Similarly, switch pole S1*d*, which is associated with the C4 class of transmission lines, has its associated contacts 3002, C1 and C2 connected to −15 volts while its contact C4 is floating. Each pole is then connected to the gate of all FET's which are to be enabled when that class of transmission line is to be simulated. Thus, the gate of Q1 is connected to pole S1*a*. Therefore, when S1*a* is resting on any of contacts C1, C2 or C4, the gate of Q1 is tied to a low voltage at the junction of R9/and R95 thus rendering the transistor nonconductive. However, when the pole S1*a* is connected to 3002, the gate of Q1 is grounded through R95 and the transistor is on. Thus, setting the switch S1 to 3002 selects R1 as the input resistor for the first stage Biquad. Setting switch S1 to 3002 will also select Q5 and Q9 and therefore insert resistors R5 to correspond to the one stage feedback resistor and R7 to correspond to the three stage feed-back resistor. When switch S1 selects 3002 a similar effect takes place at each of sections 2–6 in the simulator.

Thus, in effect, each of the six sections in the simulator is equivalent to the Biquad shown in FIG. 2*a* with the values to input resistor, one stage feedback resistor and three stage feedback resistor being selectable by switch S1 to determine the particular characteristics of that Biquad for the class of transmission line being simulated. There are four exceptions to this general statement.

The first exception relates to the second Biquad section when the C2 class of transmission line has been selected for simulation. Reference to the second Biquad section in FIG. 3 will show that there is no resistor corresponding to the input resistor, that the resistor corresponding to the one stage feedback resistor is a short circuit and that the resistor corresponding to the three stage feedback resistor, R87, is constant regardless of the setting of switch S1. In fact, when the C2 simulation is being selected by switch S1, Biquad section 2 is essentially shortcircuited. The output of Biquad section 1 goes directly to the amplifier which corresponds to K4 through R56. The output of the first Biquad section is not fed to the amplifier in the second Biquad section which corresponds to K1 at all. Furthermore, the effect of Q50, which is selected by S1*c*, is to shortcircuit the amplifier in the Biquad section 2 which corresponds to K1. Thus, there is no need for providing an input resistor for the second Biquad section when the C2 class of transmission line is being simulated.

The same statement holds true with respect to the third Biquad section in FIG. 3 when the C4 class of transmission line is being simulated. In that case, Q52 provides the shortcircuiting function in section 3 that had been provided by Q50 in section 2.

Finally, the fourth Biquad section is also bypassed, in the same manner that sections 2 and 3 are bypassed, when either the C2 or C4 class of transmission line is being simulated. In that case, either Q53 or Q51 provides the shortcircuiting function for the amplifier which corresponds to K1 of FIG. 2*a*.

For each of the four classes of transmission lines whose attenuation and delay characteristics can be simulated using the apparatus shown in FIG. 3, each of the Biquad sections is tuned to a different frequency. The table below defines for each of the classes of transmission lines the resonant frequency of the six Biquad sections shown in FIG. 3.

| Section | 3002 | C1 | C2 | C4 |
|---|---|---|---|---|
| 1 | 300 Hz | 300 Hz | 430 Hz | 430 Hz |
| 2 | 600 Hz | 600 Hz | — | 600 Hz |
| 3 | 800 Hz | 800 Hz | 800 Hz | — |
| 4 | 2.6 kHz | 2.6 kHz | — | — |
| 5 | 2.8 kHz | 2.8 kHz | 2.87 kHz | 2.8 kHz |
| 6 | 3.0 kHz | 3.0 kHz | 3.14 kHz | 3.1 kHz |

The dashes in the above table indicate that for that particular class of transmission line the particular Biquad section for which the dash appears is bypassed as has been explained above. The switch S2 provides a path for bypassing the delay and attenuation characteristics simulator when such simulation is not desired. This corresponds to the off position of control knob 38 (shown in FIG. 1).

FIGS. 5*a*–5*d* show the definitions for each of transmission lines 3002, C1, C2 and C4 with respect to delay and attenuation. The curves on the same Figures represent the delay and attenuation characteristics of the apparatus shown in FIG. 3 for the appropriate class of transmission line. That is, the curves on FIG. 5*a* represent the characteristics of the apparatus shown in FIG. 3 wherein switch S1 is in its 3002 position. As an aid to reading FIG. 3 it will be helpful to note that when switch S1 is in the 3002 position the following FET's are enabled: Q1, Q5, Q9, Q13, Q16, Q19, Q22, Q25, Q27, Q29, Q32, Q35, Q37, Q41, Q45, Q58. When switch S1 is in its C1 position, the following FET's are enabled: Q2, Q6, Q10, Q14, Q17, Q20, Q23, Q26, Q28, Q30, Q33, Q48, Q38, Q42, Q49, Q59. When switch S1 is in its C2 position, the following FET's are enabled: Q3, Q7, Q11, Q21, Q24, Q31, Q34, Q36, Q39, Q43, Q46, Q50, Q51, Q60. When switch S1 is in its C4 position, the following FET's are enabled: Q4, Q8, Q12, Q15, Q18, Q40, Q44, Q47, Q52, Q53, Q55, Q56, Q57, Q61. Each of the FET's perform a switching function to select a particular resistor, when enabled. The switches they replace are the switches shown in FIG. 2*a*.

Figure 4A:
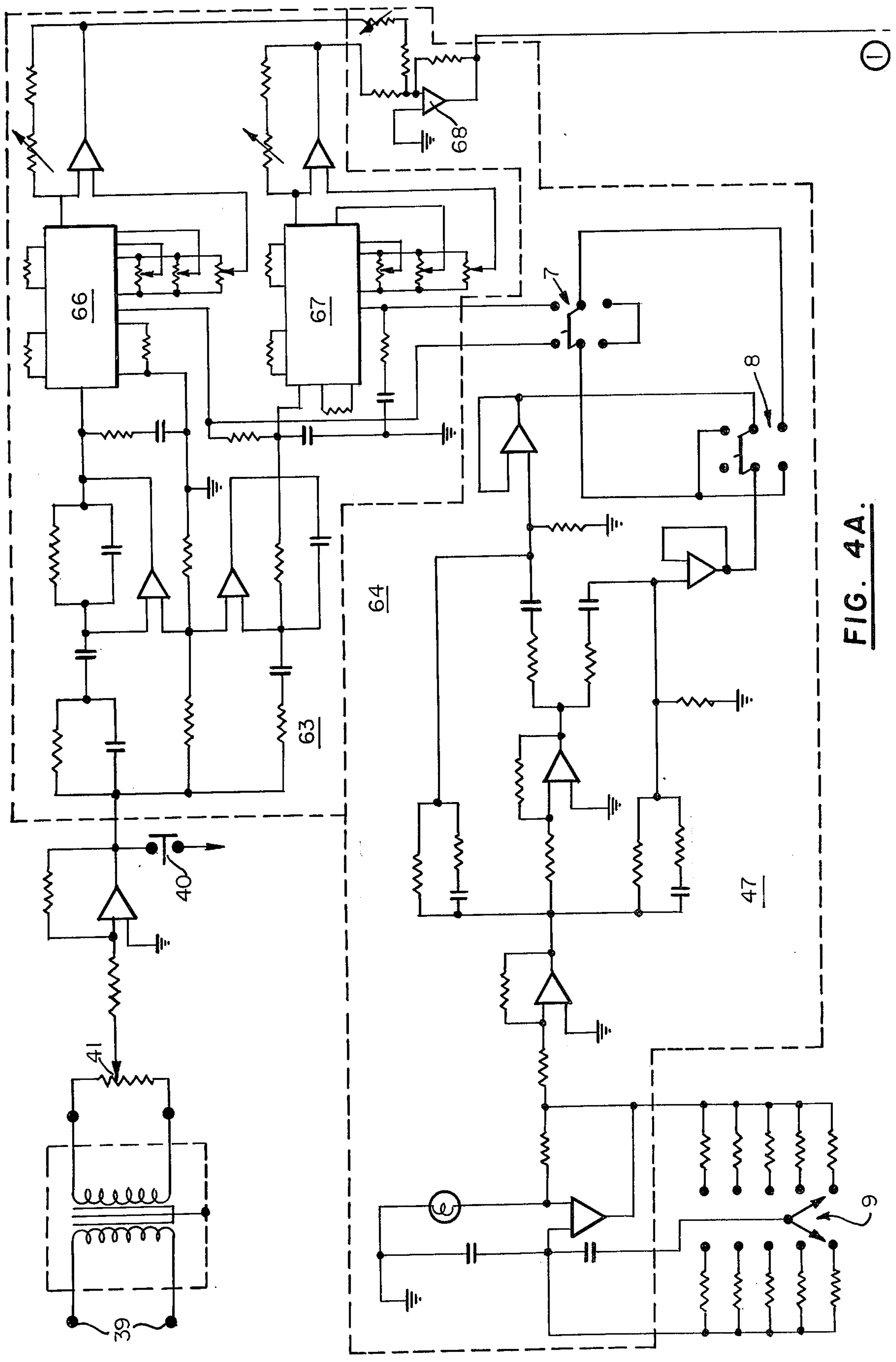
Figure 4B:
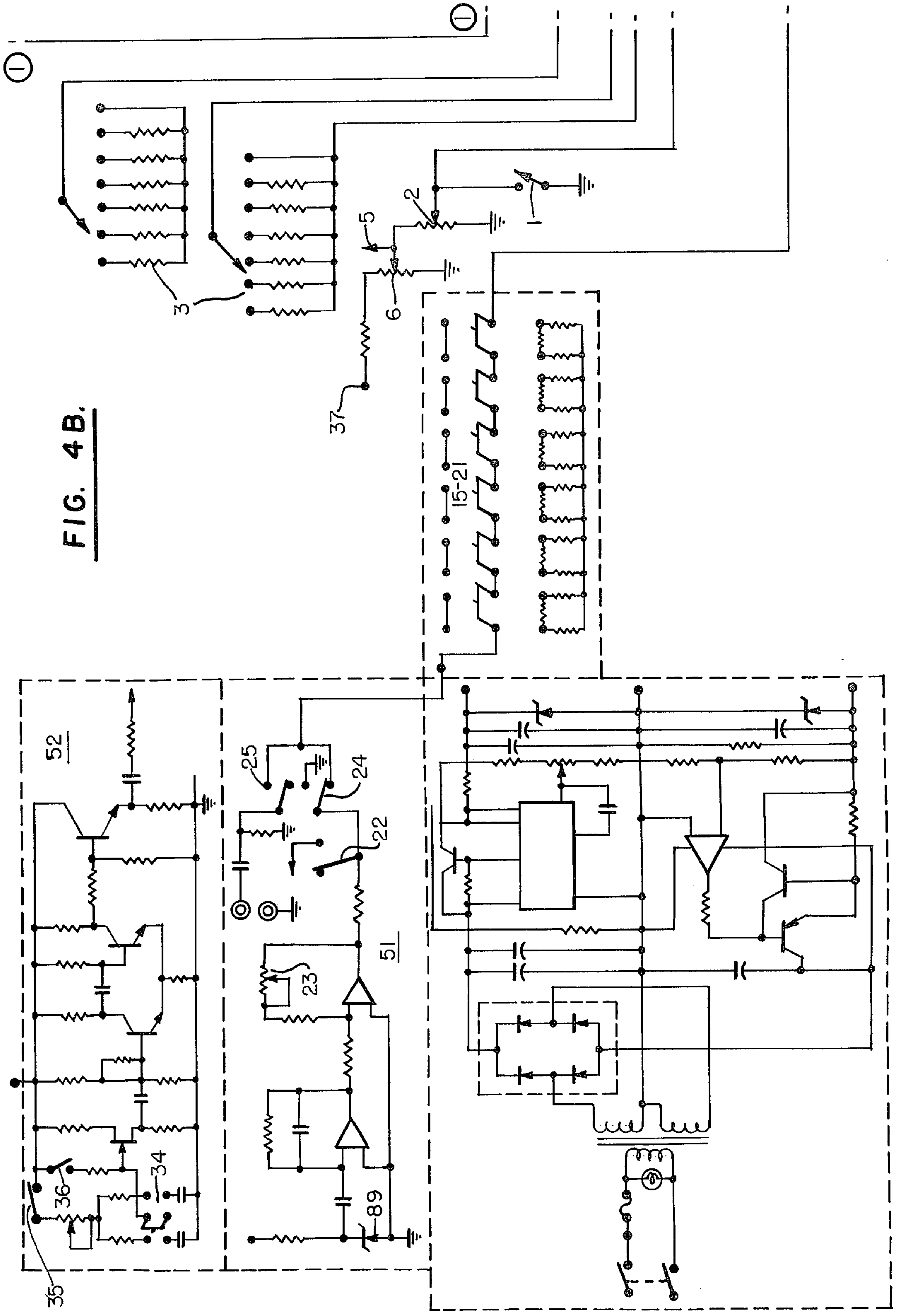
Figure 4C:
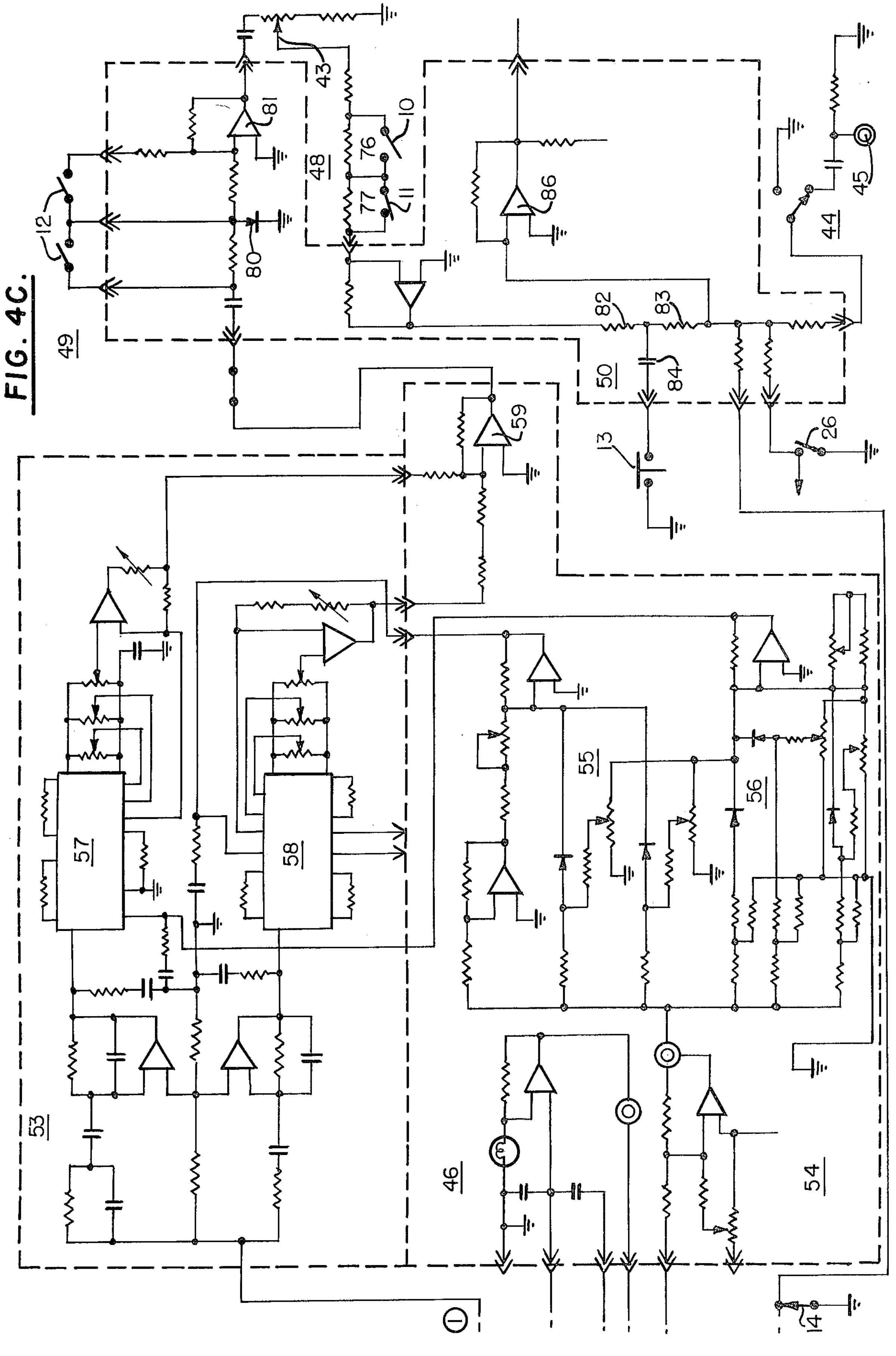

FIGS. 4*a*, 4*b* and 4*c* show a detailed schematic of a portion of the apparatus which is shown in FIG. 2, in block diagram form. Since the manner in which the apparatus shown in FIG. 2 functions has been explained previously, with reference to FIG. 2, we will here merely identify the detail schematics which correspond to the block diagram apparatus shown in FIG. 2.

Illustrative of the fact that the order in which the phase jitter, frequency shift, amplitude hit and/or drop out, harmonic distortion and phase hit circuits are used is arbitrary, is the fact that in FIG. 4 the input is shown as directed to the frequency shift circuit 47 whereas FIG. 2 shows the input directed to the phase jitter circuit 46. As has been said before, the order in which the circuits are arranged is arbitrary. Therefore, the resulting output signal from the circuit of FIG. 2 would be identical to the resulting output circuit from FIG. 4.

The input transformer in FIG. 4 is identified by reference to the input terminals 39, shown in FIG. 1. The calibration potentiometer 41 is also shown in FIG. 1. The push-to-calibrate switch 40 is likewise shown in FIG. 1. The phase shift circuits 63 and 64 (shown in FIG. 2) are shown in detail form in FIG. 4. Although specific resistor and capacitor values are not shown in FIG. 4, the computations for resistor and capacitor values for 90° phase shift circuits is well within the level of skill in the art. See for instance "Computation Methods for Broad-Band Ninety Degree Phase-Difference Networks", by Albersheim and Shirley, appearing in IEEE Transactions on Circuit Theory, May, 1969, pages 189–196. The multipliers 66 and 67 are solid state integrated circuit multipliers of which a variety are available in the market. Applicants have found that Motorola MC 1494L is one such suitable integrated circuit multiplier. The output of frequency shift circuit 47 is taken through summing operational amplifier 68. This output is fed as an input to the phase jitter circuit 46. Phase jitter circuit 46 has one 90° phase shift circuit 53 and includes two similar integrated circuit multipliers 57 and 58. The phase jitter oscillator 54 is operator-controlled both as to amplitude and frequency. The frequency of the phase jitter oscillator is controlled by rotary switch 3 and the amplitude is controlled by potentiometer 2. The output of the phase jitter oscillator is fed to sin function generating network 55 and cos function generating network 56 each of which provides one input to the multipliers 57 and 58. The output of the multipliers is provided to operational summing amplifier 59. The output of the phase jitter circuit 46 is provided as an input to the harmonic distortion network 49. This includes operational amplifier 81. Potentiometer 43 is provided to enable control of the output level of the simulator. The output of the potentiometer 43 provides an input to the amplitude hit and/or drop out circuit 48. This includes resistors 76 and 77 and switches 10 and 11 (shown in FIG. 1). The ouput of the amplitude hit and/or drop out circuit is provided as an input to the phase hit circuit 50 which includes resistors 82 and 83, capacitor 84 and pushbutton switch 13 (shown in FIG. 1). The output of the phase hit circuit forms one input to the summing output amplifier 86. A second input to this summing amplifier is provided by the broad band noise generator 51. The noise source of this generator comprises zener diode 89. Provision is made in the broad band noise generator circuit 51 for an external noise source. This provision includes switch 24 to select between internal or external noise sources. Furthermore, the push-to-calibrate switch 22 enables the level of the noise source to be adjusted via potentiometer 23. The output of the noise source is fed to an attenuator whose controls 15–21 (shown in FIG. 1) determine the degree of attenuation. The output of the attenuator is fed through on-off switch 14 to the summing amplifier 86.

A third input to the summing amplifier 86 is provided by the impulse noise generator circuit 52. The rate of pulse production is controlled by potentiometer 35 and range switch 34. Pushbutton switch 36 also provides for manual pulse production. The output from the pulse source is provided to an attenuator (not shown in FIG. 4). The attenuator output is provided to on-off switch 26 as a further input to summing amplifier 86. FIG. 4 also shows the external tone input terminal 45 as well as the tone on-off switch 44 which forms a further input to summing amplifier 86.

Thus the simulator produces an output signal which is related to the input signal as delayed and attenuated by one of a number of transmission line characteristics (or without delay and attenuation) along with selectable random effects by simply adjusting the operator controls.

We claim:

1. A transmission line simulator for simulating one of a number of transmission lines having an input and an output and having serially connected therebetween,
  an attenuation and delay simulator comprising active circuits for selectively simulating the attenuation and delay characteristics of a selected one of a number of transmission lines, and
  circuit means for selectively modifying the signal supplied thereto to simulate one or more of the random effects of phase jitter, frequency shift, amplitude hit and/or drop out, harmonic distortion, phase hit, broad band noise and impulse noise which result from transmission from a signal over a transmission line,
  said circuit means including phase jitter circuit means which produces a signal which can be expressed as A sin $(wt + B \sin w_j t)$ where the input signal to said phase jitter circuit means has an amplitude A, a radian frequency $w$, B is the amplitude of phase jitter and $w_j$ is the phase jitter radian frequency.

2. The apparatus of claim 1 in which B and $w_j$ are selectable by varying parameters of said phase jitter circuit means.

3. A transmission line simulator for simulating one of a number of transmission lines having an input and an output and having serially connected therebetween,
  an attenuation and delay simulator comprising active circuits for selectively simulating the attenuation and delay characteristics of a selected one of a number of transmission lines, and
  circuit means for selectively modifying the signals supplied thereto to simulate one or more of the random effects of phase jitter, frequency shift, amplitude hit and/or drop out, harmonic distortion, phase hit, broad band noise and impulse noise which result from transmission of a signal over a transmission line, said circuit means including frequency shift circuit means which produces an output signal which can be expressed as A sin $(w \pm w_s) t$, where the input signal to said frequency shift circuit means has an amplitude A, and a radian frequency $w$ and $w_s$ is the frequency by which said input signal is shifted by said frequency shift circuit means.

4. The apparatus of claim 3 in which $w_s$ is selectable by varying the parameters of said frequency shift circuit means and in which said frequency shift circuit means includes switching means to select whether a radian output frequency of $w + w_s$ or $w - w_s$ will be produced by said frequency shift circuit means.

5. An attenuator and delay circuit for simulating the attenuation and delay produced by one of a number of transmission lines including:
  a plurality of serially connected Biquad circuit means,
  each of said Biquad circuit means having a plurality of selectable parameters, certain of said parameters determining the attenuation, delay and resonant frequency of said Biquad circuit means,
  settable means,
  selecting means operated in response to the setting of said settable means to select, in each of said Biquad circuit means, certain of said selectable parameters to simulate one of said number of transmission lines.

6. The apparatus of claim 5 in which said settable means includes a multi-pole switch having one pole for each of said number of transmission lines to be simulated,
  and in which said selecting means includes a plurality of electronic switching means connected to said switch and conditioned by the position of one of said poles of said switch.

7. The apparatus of claim 6 in which each of said Biquad circuit means includes a plurality of resistors, each one of which determines one of said certain parameters,
  each said electronic switching means being serially connected to one of said resistors,
  said settable means conditioning one of said switching means in each said Biquad circuit means for each of said certain parameters.

8. A transmission line simulator for simulating various random effects which result from transmission of a signal over a transmission line, including
  phase jitter circuit means which produces a signal which can be expressed as A sin $(wt + B \sin w_j t)$ where the sinusoidal input signal to said phase jitter circuit means has an amplitude A and a radian frequency $w$, and where $B$ is the amplitude of phase jitter and $w_j$ is the phase jitter radian frequency.

9. The apparatus of claim 8 in which $B$ and $w_j$ are selectable by varying parameters of said phase jitter circuit means.

10. The apparatus of claim 8 which further includes,
  frequency shift circuit means serially connected to said phase jitter circuit means which produces an output signal $A \sin (w \pm w_s)t$, where the sinusoidal input signal to said frequency shift circuit means has an amplitude A and a radian frequency $w$, and where $w_s$ is the frequency by which said input signal is shifted by said frequency shift circuit means.

11. The apparatus of claim 10 in which $w_s$ is selectable by varying the parameters of said frequency shift circuit means and which includes switching means to select whether an output radian frequency of $w + w_s$ or $w - w_s$ will be produced by said frequency shift circuit means.

12. The apparatus of claim 8 which further includes serially connected frequency shift circuit means, an harmonic distortion circuit, an amplitude hit and/or drop out circuit, a phase hit circuit and a variable noise simulating circuit.

13. A transmission line simulator for simulating one of a number of transmission lines having an input and an output and having serially connected therebetween,
  an attenuation and delay simulator comprising active circuits for selectively simulating the attenuation and delay characteristics of a selected one of a number of transmission lines, and
  circuit means for selectively modifying the signal supplied thereto to simulate one or more of the random effects of phase jitter, frequency shift, amplitude hit and/or drop out, harmonic distortion, phase hit, broad band noise and impulse noise which result from transmission of a signal over a transmission line, said circuit means including a serial connection of a variable phase jitter circuit, a variable frequency shift circuit, and harmonic distortion circuit, an amplitude hit and/or drop out circuit, a phase hit circuit and, connected in parallel therewith a variable noise simulating circuit.

* * * * *